United States Patent Office 3,370,041
Patented Feb. 20, 1968

3,370,041
POLYMERIZATION PROCESS EMPLOYING TRANSITION METAL COMPOUNDS AS CATALYSTS
Walter A. Kornicker, Raleigh, N.C., Erhard P. Benzing, Kirkwood, Mo., and Eli Perry, Raleigh, N.C., assignors to Monsanto Company, St. Louis, Mo., a corporation of Delaware
No Drawing. Original application Feb. 25, 1963, Ser. No. 260,830. Divided and this application June 17, 1966, Ser. No. 574,844
12 Claims. (Cl. 260—67)

ABSTRACT OF THE DISCLOSURE

The invention is a polymerization process using a new catalyst of the formula $(R^1R^2N)_a(R^3O)_b(BH_4)_cMX_d$ where M is a transition metal or transition metal oxide of Groups IV–a, V–a, VII–a or VIII of the Mendeleeff periodic classification.

This application is a division of copending application Serial No. 260,830, filed February 25, 1963.

The present invention relates to transition metal compounds, a process preparing these compounds, and the use of these compounds as polymerization catalysts.

The transition metal compounds of the invention have the following general formula $$(R^1R^2N)_a(R^3O)_b(BH_4)_cMX_d$$

In this formula $R^1$, $R^2$ and $R^3$ are identical or different aliphatic, cycloaliphatic, araliphatic or aromatic hydrocarbon radicals or heterocyclic radicals. $R^1$ and $R^2$ taken together can also form a heterocyclic ring. M is a transition metal or metal oxide of the Groups IVa, Va, VIa, VIIa and VIII of the Mendeleeff periodic classification. Identical or different organic ligands can be linked by their radicals R or by a common radical R. The letters $a$, $b$, $c$ and $d$ are zero or integers with the letter $d$ possibly till to be divided by the base valency of the acid anion X, and $a+b+c+d$ correspond to the effective valency of the metal or metal oxide radical M in the compounds of the above formula. Preferably the radicals R are each free of non-benzenoid unsaturation, i.e. olefinic or acetylenic unsaturation, and each have not more than 18 carbon atoms, more preferably not more than 8 carbon atoms. Preferred radicals R are saturated aliphatic hydrocarbon radicals either cyclic or open chain; however, as will be seen in the more detailed description of the invention and as has been suggested above the radicals R can also be araliphatic, aromatic, heterocyclic hydrocarbon radicals, the heterocyclic radicals having oxygen, sulfur and nitrogen heteroatoms, or $R^1$ and $R^2$ taken together with the nitrogen to which they are attached can form heterocyclic hydrocarbon radicals having not more than 18 carbon atoms, preferably not more than 8 carbon atoms.

The following derivatives of transition metals to be considered here have not yet been known and are novel:

1. Derivatives having as ligands exclusively secondary amine radicals, except the respective derivatives of the highest valent titanium and zirconium.

2. Derivatives having at least two ligands which differ with regard to their heteroatom bound to the metal and which are selected from alkoxyl, secondary amine radicals and $BH_4$.

3. Derivatives having as ligands alkoxyl, secondary amine radicals and/or $BH_4$ in addition to acid anions, except alkoxyl derivatives of the transition metal chlorides of Groups IVa and Va of the periodic classification, and $BH_4$ containing derivatives of the titanium chloride.

For this reason the formula set forth is valid with the restriction that cannot be admitted the $R^3O$ ligands solely or together only with halogen on a transition metal, the $R^1R^2N$ ligands solely on the highest valent titanium or zirconium, and the $BH_4$ ligands solely or together only with halogen on titanium.

Examples of transition metals or transition metal oxides to be met with the products of invention are: Ti, TiO, Zr, ZrO, $Zr_2O_3$, V, VO, Nb, NbO, Cr, $CrO_2$, Mo, MoO, $MoO_2$, W, WO, $WO_2$, Mn, Fe, Ta, Co, Ni, etc.

Examples of acid anions are: Halogen, $ROSO_3$, $SO_4$, $(RO_2)PO_2$, $ROPO_3$, $PO_4$, $NO_3$, $ClO_3$, $CN$, $SCN$, $CH_3COO$, $CH_3COCHCOCH_3$, etc.

The secondary amine derivatives can be prepared by reacting alkali salts, Grignard compounds etc. of secondary amines with salts, preferably halides, of transition metals or transition metal oxides. According to the stoichiometric proportion of the reactants used, there are formed products containing as ligands either exclusively amide groups or amide groups and acid anions; by reacting, for example, vanadiumoxytrichloride and lithiumdimethylamide this reaction is illustrated by the following equation:

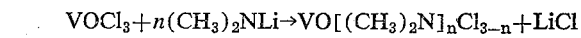

Secondary amines suitable for the reaction are, for example, dimethylamine, diethylamine, dipropylamine, dibutylamine, methylcyclohexylamine, dicyclohexylamine, methylbenzylamine, dibenzylamine, methylaniline, propyl-p-toludine, diphenylamine, pyrrolidine, piperidine, morpholine etc.; moreover also bi- and multi-valent secondary amines, like 1,2-bis-(methylamino)-ethane, 1,3-bis - (ethylamino) - propane, 1,2 - bis - (methylamino)-propane, 1,6 - bis - (methylamino) - hexane, 1,4-bis-(methylamino)-benzene, 1,2-diphenylguanidin, 1,2-dipropylhydrazine, tris-(methylamino)-s-triazine etc.

In the same manner are obtained by reacting alkalialcoholates, -phenolates, or -boranates the corresponding derivatives.

It is possible to obtain also multi-substituted transition metal compounds with different organic ligands or containing organic ligands and $BH_4$, i.e. all ligands to be considered here can be combined. In such cases one reacts, or example, a transition metal halide either simultaneously or stepwise with at least two salts which are able to give off different ligands. Mixed ligands containing transition metal compounds are particularly useful as catalysts and also for other purposes, because of the varied firmness of attachment of their ligands.

For the manufacture of the novel products according to this direct method one proceeds thus, that the metal compound of the ligand to be introduced is prepared in usual manner in an appropriate solvent firstly, for example, from dialkylamines by means of butyllithium, Grignard agents etc., from diarylamines, alcohols and phenols by means of sodium, potassium, lithiumhydride etc. and from borontrifluoride by means of lithiumhydride etc. Then, the reaction mixture is brought together with a conveniently dissolved transition metal halide or -oxyhalide and, if necessary, heated for some time. Owing to the sensibility of the starting- and end-products, any moisture must be excluded from the reaction mixture. In the stepwise synthesis it makes no difference which organic substituents are introduced at first, since acid anions like, for example, chlorine are easier exchanged than organic ligands already present. On the contrary, the $BH_4$ ligand must always be introduced last, since it would be altered by the reacting amides, alcoholates and phenolates. Of course, instead of two different organic ligands, for example, alkoxide and secondary amide, there can be introduced one organic ligand possessing two respective functional groups, for example, a hydroxyl and a secondary amine group which both become attached to the same transition metal atom or, dpending on the circumstances, to two different transition metal atoms. Such compounds correspond to the following types:

I.

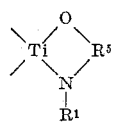

II.

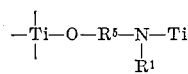

($R^5$=hydrocarbon radical)

Compounds of type II are obtained, when transition metal compounds having still one acid anion attached to the metal and capable of being substituted, are reacted with salts or Grignard compounds respectively which transfer radicals of bifunctional ligands, or without regard to the number of acid anions present, when the hydrocarbon radical $R^5$ owing to steric properties hinders the formation of a compound of the first type. Bifunctional substituents showing identical groups have already been enumerated above and such showing varied groups which come into question are aminoalcohols and aminophenols.

One can quite generally exchange organic ligands partially for acid anions by treating the transition metal compounds with a calculated amount of water-free acid, such as hydrohalide, carboxylic acid etc.

A further method for preparing organic substituted transition metal halides or -oxyhalides is based on the fact, that by reaction of chlorine, bromine or iodine with the secondary amide groups these can entirely or partially be replaced. This method has practical importance especially for the manufacture of the less easily available bromides and iodides.

Finally, the easier available chlorides can be converted into other salts by double reaction with salts of other acids, for example, KCN, NaCNS, sodium oxalate, sodium acetylacetonate etc.

A further method for the preparation of transition metal compounds which possess a combination of the organic ligands, $BH_4$ and acid anions taken in consideration here is based on the transfer of one or more ligands from one compound to the other. This mutual exchange of substituents, further called "coproportionation," proceeds with compounds which are similar with respect to the metal or metal oxide, according as are used two or even three compounds.

The composition of the endproducts formed by the coproportionation is directed on one hand by the stoichiometric ratio of the reactants and on the other hand also by the stickiness of the ligands. Only in an ideal case as, for example, in the coproportionation of tetrakis-(dimethylamido)-titanium and tetrakis-(iso-propoxy)-titanium, one obtains practically quantitatively the desired uniform bis-(dimethylamido)-bis-(iso-propoxy)-titanium according to the scheme:

$Ti[N(CH_3)_2]_4 + Ti(i\text{-}OC_3H_7)_4 \rightarrow$
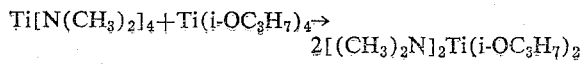

In other cases there can be formed mixtures of various endproducts. It is understood that also transition metal compounds can be coproportionated which have different ligands and/or different transition metals and/or have a transition metal and a transition metal oxide. When, for example, tetrakis-(dimethylamido)-titanium and tetrakis-(iso-propoxy)-zirconium are coproportionated according to the scheme mentioned above, a mixture consisting of about equal parts of bis-(dimethylamido) - bis - (iso-propoxy)-titanium and bis-(dimethylamido) - bis-(iso-propoxy)-zirconium is obtained. It is intelligible, that also the coproportionation with transition metal compounds which have non-identical metals will only occur in the ideal case regularly and will depend on the equilibrium which is established in the reaction mixture under the given conditions, thereby this equilibrium can possibly be shifted in a defined direction by removing one of the formed reaction products. Although the separation of such a mixture into analytically pure products is hard to realize, it can however be demonstrated that a transfer of ligands according to the process of invention occurs also between different transition metals. When, for example, dimethylamido-titanium-trichloride, which in contrast to all other compounds of the same chloride class is scarcely soluble in benzene, is heated with, for example, tetrakis-(dimethylamido)-zircon or with tris-(dimethylamido)-vanadium-oxide in anhydrous benzene, it goes gradually into solution, since bis-(dimethylamido)-titanium-dichloride is formed which is easily soluble in benzene.

Often, it may be advantageous to coproportionate easier and cheaper available metal compounds, such as aluminium-alkoxylate, tin-amides etc. with corresponding transition metal compounds. Thereby, it is formed a mixture of identical or closely related derivatives of the transition metal and the aluminum or tin. Such mixtures as well as all the other mixtures herein described can be used without separation as polymerization catalysts for alpha-olefins, acrylate, styrene, acrylonitrile etc.

The coproportionation is carried out in simple manner by heating together at least two different derivatives of transition metals, or possibly together with derivatives of aluminium or tin or any suitable metal or element, in the convenient proportions in a solvent under exclusion of humidity and, if necessary, also under exclusion of oxygen. A catalyst may be added if desired.

The isolation of the various reaction products obtained according to the manufacturing processes described herein, can be done after removal of the solvent in usual manner by crystallization, sublimation and in certain cases also by distillation in vacuo. But the arising solution or mixture respectively can also be used directly.

The organic transition metal compounds containing the ligands mentioned, especially secondary amine radicals or $BH_4$, show the noteworthy property to split off the ligands on heating, thereby a lower valent transition compound is formed. This decomposition occurs with, for example, alkoxy-titanium-triboranate and with tetrakis-(dimethylamido)-titanium according to the following equations:

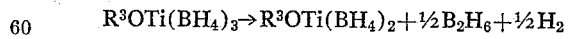
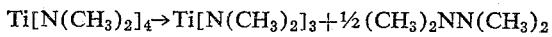

The decomposition occurs particularly easy with compounds having at least two $BH_4$ or secondary amide ligands. In the latter case is formed at 95–105° C./11 mm. almost quantitatively tris-(dimethylamido)-titanium besides tetramethylhydrazine.

EXAMPLE 1

*Dimethylamido-titanium-trichloride*

7.4 ml. (0.067 mole) of titanium tetrachloride are added under nitrogen to a solution of 5 g. (0.022 mole) of tetrakis-(dimethylamido)-titanium in 100 ml. dry benzene. The reaction mixture is refluxed for one hour. The insoluble product is obtained by filtration, washed with benzene and dried. Yield: 16 g. (96% of the theory). Olive-green powder, extremely sensitive to moisture.

C₂H₆NCl₃Ti (198.4). Titration with 0.1 N sodium hydroxide: 173 mg. correspond to 17.50 ml. Calculated: 17.44 ml.

EXAMPLE 2

*Tris-(N-methylanilido)-titanium-chloride*

0.36 ml. (0.0033 mole) of titanium tetrachloride is added under nitrogen to a solution of 4.7 g. (0.009 mole) tetrakis-(N-methylanilido)-titanium in 50 ml. dry benzene. The reaction mixture is refluxed for one hour. The insoluble product is washed with dry petroleum ether and dried. Yield: 3.0 g. (56% of the theory). Brown powder, sensitive to moisture.

*Analysis.*—C₂₁H₂₄N₃TiCl. Percent calculated: N-methylaniline, 52.8; Cl, 8.8. Found: N-methylaniline, 51.5; Cl, 8.7.

EXAMPLE 3

*Tris(diphenylamido)-titanium-chloride*

0.36 ml. (0.0033 mole) of titanium tetrachloride is added under nitrogen to a solution of 6.5 g. (0.01 mole) tetrakis(diphenylamido)-titanium in 50 ml. dry benzene. The reaction mixture is refluxed for one hour. The solvent is evaporated under vacuum. Petroleum ether is added to the sticky red residue which is then kept in a deep freeze. The solid product is washed with petroleum ether and dried. Yield: 4.6 g. (60% of the theory).

*Analysis.*—C₃₆H₃₀N₃TiCl. Percent calculated: C, 73.60; H, 5.15; N, 7.15; Ti, 8.15; Cl, 6.03. Found: C, 73.40; H, 5.52; N, 7.06; Ti, 8.35; Cl, 5.47.

EXAMPLE 4

*Diphenylamido-titanium-trichloride*

1.3 ml. (0.012 mole) of titanium tetrachloride is added under nitrogen to a solution of 2.9 g. (0.0004 mole) tetrakis(diphenylamido)-titanium in 50 ml. dry benzene. The reaction mixture is refluxed for one hour. The solvent is evaporated under vacuum. Petroleum ether is added to the sticky red residue which is then kept in a deep freeze. The solid product is washed with petroleum ether and dried. Yield: 3.8 g. (65% of the theory).

*Analysis.*—C₁₂H₁₀NTiCl₃. Percent calculated: C, 44.70; H, 3.13; N, 4.35; Ti, 14.88; Cl, 33.0. Found: C, 44.37; H, 3.45; N, 4.01; Ti, 14.44; Cl, 33.52.

EXAMPLE 5

*Tris-(dimethylamido)-titanium-chloride*

A solution of 10.8 g. (0.24 mole) of dimethylamine in 50 ml. diethylether is added to a solution of 15.4 g. (0.24 mole) of n-butyllithium in 150 ml. dry ether at such a rate that the ether boils gently. After all dimethylamine has been introduced, a solution of 8.8 ml. (0.08 mole) titanium tetrachloride in 25 ml. dry benzene is added within 10 minutes. The mixture is refluxed for 3 hours. The lithium chloride precipitates. The solvent is evaporated to dryness. The brown residue is sublimed under vacuum. Yield: 2.9 g. (17% of the theory), yellow crystals, sublime at 40–60° C./0.05 mm. Hg.

The corresponding compounds of zirconium and hafnium are prepared in the same way as indicated in the examples mentioned above. The same reactions are valid for the preparation of transition metal mercaptides and for their halides.

EXAMPLE 6

*Bis-(dimethylamido)-bis(iso-propoxy)titanium*

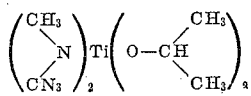

A mixture of 11.2 g. (0.05 mole) tetrakis-(dimethylamido)-titanium and 14.2 g. (0.05 mole) tetrakis(iso-propoxy)-titanium is refluxed for one hour in benzene. The solvent is removed under reduced pressure, distillation under vacuum yields a light-yellow liquid. Yield: 24.2 g. (95% of the theory) B.P.=60° C./0.02 mm. Hg. (The boiling points of the starting materials are respectively: 54° C./0.1 mm. Hg. and 48° C./0.004 mm. Hg.).

*Analysis.*—C₁₀H₂₆O₂N₂Ti (254.2). Percent calculated: C, 47.3; H, 10.3; N, 11.0. Found: C, 47.1; H, 10.3; N, 10.7.

Properties: Extremely sensitive to moisture.

EXAMPLE 7

*Tris-(dimethylamido)-isopropoxy-titanium*

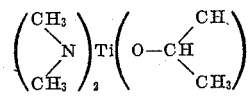

A mixture of 20.2 g. (0.09 mole) tetrakis-(dimethylamido)-titanium and 8.5 g. (0.03 mole) tetrakis-(isopropoxy)-titanium is refluxed for one hour in benzene. The solvent is removed under reduced pressure. Distillation under vacuum yields a light-yellow liquid. Yield: 8.9 g. (31% of the theory), B.P. 87° C./0.1 mm. Hg.

*Analysis.*—C₉H₂₅ON₃Ti (239.2). Percent calculated: C, 45.2; H, 10.5; N, 18.0. Found: C, 45.1; H, 10.4; N, 17.9.

EXAMPLE 8

*Tris-(dimethylamido)-vanadium-oxide*

To a solution of 12.8 g. of lithiumdimethylamide (0.25 mole) in 200 ml. of anhydrous diethylether is added a solution of 14.4 g. of vanadiumoxytrichloride (0.083 mole) in 150 ml. of anhydrous diethylether within half an hour under cooling. After the addition is complete, the dark solution is stirred for one hour at room temperature. The precipitated inorganic salts are removed by filtration under exclusion of moisture. The filtered solution is evaporated to dryness under vacuum. The residue (about 15 g.) is sublimed under high vacuum (10⁻³ mm.). Yield: 4 g. of deep red, almost black crystals (=25% of theory for VO(NMe₂)₃) M.P. 40° C.

*Analysis.*—C₆H₁₈ON₃V (M 199.2). Percent calculated: C, 36.2; H, 9.1; N, 21.1; V, 25.6. Found: C, 36.9; H, 9.7; N, 20.8; V, 24.9.

Significantly the same results are obtained when hexane is used instead of diethylether.

EXAMPLE 9

*Tris-(diethylamido)-vanadium-oxide*

It is proceeded as indicated in Example 8, but hexane is used as a solvent. From 39.0 g. of lithiumdiethylamide (0.5 mole) and 28 g. of vanadiumoxytrichloride (0.163 mole) are yielded after evaporation to dryness 50 g. of a deep red residue. Distillation under high vacuum yields a red mobile liquid. Yield: 7 g. (=15% of theory for VO(NEt₂)₃); B.P. 100° C./0.3 mm.

*Analysis.*—C₁₂H₃₀N₃OV (M 283.3). Percent calculated: C, 50.8; H, 10.7; N, 14.8; V, 18.0. Found: C, 49.9; H, 9.9; N, 14.5; V, 17.7.

EXAMPLE 10

*Bis-(diethylamido)-vanadiumoxychloride*

To a solution of 3.4 g. of tris-(diethylamio)-vanadium-oxide (0.012 mole) in 20 ml. of anhydrous benzene are added under nitrogen 0.57 ml. of vanadiumoxytrichloride (0.006 mole). An exothermic reaction occurs. The intensively red colored solution is stirred at room temperature during 1 hour. Then, the benzene is evaporated under reduced pressure, thereby the temperature must not exceed 60° C. The residue is a dark brown-red solid product which contains the calculated amount of chlorine and diethylamide bound to VO. Yield: Quantitative. Only a little part of the crude product can be distilled in high vacuum without decomposition. The main part endures a thermic decomposition, thereby a compound of three valent vanadium is formed under evolution of easily volatile nitrogen bases.

EXAMPLE 11

Tris-(dimethylamido)-titanium-borohydride 2.8 g. of lithiumborohydride ($LiBH_4$) (0.13 mole) dissolved in 60 ml. of dry tetrahydrofurane are added under nitrogen to a solution of 21.6 g. of tris-(dimethylamido)-titanium-chloride (0.10 mole; B.P. 80° C./0.001 mm.) in 100 ml. of tetrahydrofurane. The solution is refluxed for one hour. After that time the solvent is evaporated under reduced pressure. Distillation of the residue under high vacuum yields yellow crystals. Yield: 11.3 g. (=58% of the theory for $[(CH_3)_2N]_3TiBH_4$) B.P. 60° C./0.01 mm.; M.P. 50° C.

*Analysis.*—$C_6H_{22}N_3BTi$ (M 195.0). Percent calculated: C, 37.0; H, 11.4; N, 21.6; B, 5.5; Ti, 24.6. Found: C, 36.7; H, 10.4; N, 20.5; B, 6.7; Ti, 25.7.

EXAMPLE 12

Dimethylamido-titanium

Tris - (dimethylamido) - titanium - borohydride (4.0 g.=0.021 mole) is heated under vacuum in a glass bulb. At 70° C. the molten yellow substance turns black. At the same time the adduct of dimethylamine with borine and volatile nitrogen bases are evolved and condense in a cooling trap cooled with liquid nitrogen. After the flask has been maintained for two hours at 200° C. a finely divided black powder is obtained. Yield: 2.0 g., almost quantitative based on $Ti[N(CH_3)_2]$.

*Analysis.*—$C_2H_6NTi$. Percent calculated: C, 26.1; H, 6.5; N, 15.2; Ti, 52.2. Found: C, 23.86; H, 4.62; N, 18.24; Ti, 47.93.

These results correspond to $C_2H_6NTi$ contaminated with 0.2 atoms of boron and 0.3 atoms of nitrogen.

*Properties*: This compound of low valency titanium is extremely easy to oxidize. In contact with air it ignites spontaneously. It reacts violently with water, yielding hydrogen, dimethylamine and $Ti(OH_3)$.

EXAMPLE 13

This example describes the polymerization of acrylonitrile (AN) using

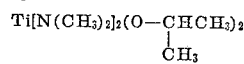

a catalyst of the invention. The reactor flask is heated at 150° C. and cooled under nitrogen to prepare it for the polymerization experiment. To the flask is added 10 ml. of toluene purified by fractionation and dried over sodium. Then 2.9 ml. of acrylonitrile is added to the reaction flask and the flask and contents are cooled to −76° C. At this 0.34 ml. of the catalyst is added slowly to the flask. A rapid reaction occurs. After 4 hours 3 ml. of methanol is added to the reaction mixture and the reaction mixture is transferred to a large volume of methanol to precipitate the polymer. The recovered crude polymer is treated with dimethylformamide to remove catalyst residues and the polymer is separated from the dimethylformamide by filtration and dried under vacuum. The polymer yield is 2.2 g. (90%) having a molecular weight of about 30,000. Compared to a normal free-radical produced, polyacrylonitrile the polymer has a narrow molecular weight distribution and shows several extra lines in X-ray analysis (indicating greater molecular order).

EXAMPLE 14

This example describes the polymerization of acrylonitrile using a modified catalyst of the invention, namely $Ti[N(CH_3)_2]_4$ (I) and n-tributylphosphine (II). As in Example 13, the reactor is prepared by heating at 150° C. and cooling under nitrogen. To the reactor is added 31 ml. of water-free toluene, 0.47 ml. of (I) and 1.0 ml. of (II) with stirring. The temperature of the flask and contents is adjusted to −25° C., and 9 ml. of acrylonitrile is added to the flask over a period of 10 minutes. The reaction is allowed to continue for 15 hours and the polymer is precipitated by pouring the reaction mixture into 800 ml. of methanol. The crude polymer is then filtered from the methanol, dried and subjected to additional purification steps which involved treating with dimethylformamide, filtering to separate the polymer, precipitating the polymer from methanol, filtering to remove further methanol and drying under vacuum. Conversion is 98% to a polymer having a molecular weight of about 30,000. Control experiments using 5 times as much of each of the above catalysts individually give only 60% conversion to polymer showing the synergistic effect of the mixed catalysts.

EXAMPLE 15

This example describes the polymerization of acrylonitrile using yet another catalyst of the invention, namely $VO[N(CH_3)_2]_3$. Again the reactor is prepared by heating at 150° C. and cooling under nitrogen. To the reactor is added 5.8 ml. of purified acrylonitrile and 20 ml. of water-free heptane. The temperature of the reactor charge is maintained at 20° C. while stirring and adding 0.76 ml. of catalyst dropwise. The reaction is allowed to continue for 100 hours after which time the polymer is recovered by precipitation from methanol. The polymer is subjected to usual purification techniques as described in Example 14 above and it is determined that conversion is 91% to a polymer having a molecular weight of about 30,000. This compares with 0% conversion for a control experiment run under the same conditions except in the absence of catalysts.

The transition metal amides and amides-alkoxides, such as, for example, $Ti(NMe_2)_4$, $Ti(OR)_2(NMe_2)_2$, etc. are strong catalysts for acrylonitrile polymerization over the temperature range of −100° to 100° C. with the preferred range being −76° to +22° C. Conversion is highest at the lowest temperatures. These catalysts are also useful for polymerizing methacrylonitrile under like conditions. The degree of polymerization of the polymer is inversely related to the temperature. The solvent is important in determining the degree of polymerization. Dimethylformamide gives the lowest degrees of polymerization. Generally, the polymers made with $Ti(NR_2)_4$ are easily soluble in dimethylformamide up to very high degrees of polymerization. This result suggests that the polymer is linear and of narrow molecular weight distribution. The catalytic activity varies with the solvent, decreasing in the series heptane>toluene>tetrahydrofuran>dimethylformamide. The activation energy of the polymerization rate has a small negative value for both the $Ti(NMe_2)_4$ and $Ti(NMe_2)_2(OR)_2$ catalysts. The effect of dimethylformamide in terminating active centers which is apparent using $Ti(NR_2)_4$ is enhanced with $Ti(RO)_2(NR_2)_2$. The molecular weight has a large negative activation energy in dimethylformamide and heptane, but is almost zero in tetrahydrofuran and toluene for the $Ti(OR)_2(NMe_2)_2$ catalyst. When using the $Ti(NR_2)_4$, the activation energy for the molecular weight is negative and large for all solvents. Neither $Ti(OR)_4$ nor $TiCl_4$ are catalysts for acrylonitrile polymerization at −76° and at +25° C. Thus, the strength and type of the catalysis can be varied by systematically and gradually varying the nature of the substituent groups (e.g. $Cl_3Ti(NR_2)$ to $Ti(NR_2)_4$ or $(RO_3Ti(NR_2)$ to $Ti(NR_2)_4$). Other transition metal derivatives or transition metal oxide derivatives have similar properties. $VO(NEt_2)_3$ likewise is a strong catalyst with an activation energy of 3–4 kcal./g. mole. The molecular weight is higher at lower temperatures, but this variation may be due to a rate effect. In general, in the case of amide derivatives of Ti and V, ionic catalysis is more easily obtained when the monomer contains an electron rich group. Solvent of high dielectric constants and low temperatures favor the ionic mechanism. With mixed catalysts of (n-butyl)$_3$P and Ti(NR$_2$)$_4$, as high conversions are obtained with 0.01 of the normal amount of Ti(NR$_2$)$_4$ plus 0.1 to 0.2 of the normal amount of phosphine as with the normal amounts of either catalyst used separately. Thus, a synergistic effect can be claimed by using organic transition metal compounds plus triorgano-phosphines.

EXAMPLE 16

This example describes some styrene polymerization experiments using catalysts of the invention which are as follows: Ti[N(CH$_3$)$_2$]$_2$ (I) and Ti [N(CH$_3$)$_2$]$_4$ (II). The three reaction flasks were prepared for the three experiments of this example by heating the flasks at 150° C. and cooling under nitrogen. To one of the flasks is added a small amount of catalyst (I), to a second flask is added the catalyst (II) in about an equivalent amount to the amount added to the first flask, and to the third flask is added ½ equivalent of (I) and ½ equivalent of (II). All three flasks are maintained at 25° C. with agitation and 20 ml. of purified styrene is added to each flask over a period of 5 minutes. After 167 hours the reaction masses are poured into 500 ml. of methanol and the catalyst residues are removed by filtering and redissolving. The yields of polymer from the first two flasks are low on the order of about 10%; whereas, in the case of the last flask having the mixed catalyst the yield is more than twice as large. A control experiment without catalyst shows a conversion of only 0.3%. Thus it is seen that all the catalysts are effective and the combination of the 2 and 4 valent catalysts are more effective than either the 2 or 4 valent catalysts taken alone.

Ti(NMe$_2$)$_4$, ClTi(NMe$_2$)$_3$, and Cl$_2$Ti(NMe$_2$)$_2$ are weak free radical catalysts for styrene with gradually diminishing strength in the above order, allowing a choice of catalyst for a particular type of reaction. All are soluble in the reaction media. The catalysts are also useful for polymerizing α-methyl styrene. With Ti(NMe$_2$)$_4$ at +25° C. a molecular weight (MW) of about 100,000 is obtained, giving a chain transfer constant for the catalyst of about 0.05. A wide variety of solvents, such as toluene, Decalin, dioxane, heptane, tetrahydrofuran, dimethylformamide, etc., can be used, which act only as inert diluents. Dimethylformamide forms an insoluble complex with the titanium compounds. Similar complexes would be expected using dioxane and tetrahydrofuran. If they do form, they are soluble. These complexes do not appear to effect the catalytic activity of the titanium compounds. There are no significant differences in the polymerization rates when substituting the NMe$_2$ for the NEt$_2$ radicals, both being radicals of strongly basic secondary amines. But, for example, the substitution for a diphenylamine radical decreases the activity. Ti(OR)$_4$ is not a catalyst for styrene, but

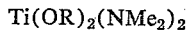

is found to be a weak catalyst approaching the Ti(NMe$_2$)$_4$ strength. There is a series of compounds having gradually decreased strength from Ti(NMe$_2$)$_4$ to

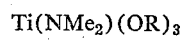

The Ti(OR)$_2$(NMe$_2$)$_2$ possesses a greater storage stability than the other titanium compounds of the same series. The order of magnitude of the chain transfer constant for the catalysts at 60° C. is about 0.022. Ti(NMe$_2$)$_3$BH$_4$ is also a weak catalyst for the polymerization of styrene. However this catalyst is weaker than Ti(NMe$_2$)$_4$ and corresponds more to the catalytic action of Ti(NMe$_2$)$_3$Cl and Ti(NMe$_2$)$_2$Cl$_2$. The analogs of other transition metals or transition metal oxides display the same properties as catalysts for styrene. Likewise, VO(NEt$_2$)$_3$ at +25° C. has a rate of conversion of 0.03%/h. The styrene polymers obtained by the use of these catalysts have normal softening points. However, the largest Bragg X-ray spacing is smaller than in normal free radical polymer, so that it is concluded that the chain order is different than in normal polymer and crystallinity may be achieved.

EXAMPLE 17

This example describes the polymerization of methyl methacrylate (NM) using the catalyst Ti[N(CH$_3$)$_2$]$_4$. To a reactor heated at 150° C. and cooled under nitrogen are added 12 ml. of water-free heptane and 1.2 ml. of catalysts. The temperature of the flask and contents is adjusted to −30° C. and 8 ml. of methyl methacrylate is added with stirring over a period of two minutes. After 36 hours the reaction mass is treated with 3 ml. of methyl alcohol and 4 drops of water. After 1 hour the mass is precipitated in 500 ml. of petroleum ether, filtered and freed of catalyst by redissolving in benzene, filtering, precipitating in petroleum ether, and the polymer vacuum dried. Yield of polymer is 75% of 200,000 molecular weight versus no polymer for a control experiment without the catalyst. When the polymer of this experiment is compared to conventional free-radical produced polymer, the softening point is 40° C. higher and the material of this example crystallizes from 4-heptanone; whereas, the free-radical polymer does not.

EXAMPLE 18

This example describes the polymerization of methyl methacrylate using

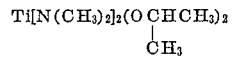

catalyst of the invention. To a reactor heated at 150° C. and cooled under nitrogen is added 20 ml. of water-free and pure methyl methacrylate. The reactor and contents are adjusted to a temperature of −25° C. and 1.3 ml. of catalyst is added dropwise with agitation. The polymer is treated to purify it and isolate it as in Example 17. The product has a molecular weight of about 500,000 and shows a crystalline X-ray diagram when crystallized from heptanone. A control experiment yields no polymer. For the polymer of this example, the X-ray spacings determine from a powder diagram are: 13 A. sharp, 7 A. sharp, 5.2 A. sharp, 3.1 and 2.3 A. diffuse. A free-radical polymer has X-ray spacings as follows: 6.0, 2.9 and 2.1 A. all diffuse.

EXAMPLE 19

This example describes the polymerization of methyl methacrylate using the VO[N(C$_2$H$_5$)$_2$]$_3$ catalyst of the invention. The reaction flask is prepared as in Example 17. To the flask is added 5 ml. of methyl methacrylate and 15 ml. of heptane and the temperature is maintained at 25° C. Then 0.6 ml. of catalyst is added with stirring and the reaction is allowed to proceed for 164 hours. The product is worked up and purified as in Example 17. The product crystallizes from heptanone and has a softening point of 190° C. Also the product is isotactic as evidenced by the lack of absorption bands in the infrared at 9.4 and 10.9 microns. Without catalyst no polymer is obtained. Free radical polymer does not have the properties mentioned above.

EXAMPLE 20

This example describes the polymerization of methyl methacrylate using the same catalyst as was used in Exple 19. The procedure in this example is the same as in Example 19 except that dimethyl formamide is substituted for the heptane. The yield of polymer is 70%.

EXAMPLE 21

This example describes the preparation of a copolymer of methyl methacrylate and styrene using the Ti[N(CH$_3$)$_2$]$_4$ catalyst of the invention. The procedure in this example is the same as was used in Example 17 except that a mixture of methyl methacrylate and styrene are added instead of pure methyl methacrylate. Actually this example consists of two different experiments which are summarized as follows:

|  | A | B |
|---|---|---|
|  | 22° C. | −25° C. |
| Ml. methyl methacrylate | 5 | 5 |
| Ml. styrene | 5 | 5 |
| Ml. catalyst | 0.6 | 0.6 |
| Hrs. reaction | 166 | 164 |

A small yield of polymer, 2%, is obtained from flask A and this is a true copolymer 50–50 of styrene and methyl methacrylate. The product from flask B is obtained in 19% yield and is pure polymethyl methacrylate containing no styrene and 43,000 molecular weight.

While $TiCl_4$ and $Ti(OR)_4$ are not catalysts for methyl methacrylate, the transition metal compounds of invention show strong catalytic activity. The initiation by, for example, $Ti(NR_2)_4$ is anionic, at least −25° C. At higher temperatures (+25° C.), initiation may be free radical. The catalysts of the invention are also very useful for polymerizing alkyl acrylates. The rate normally is greater at −25° C. than at higher or lower temperatures and varies greatly with the specific solvent used. The molecular weight is not a function of the monomer concentration. It is affected, as well as the rate, by traces of water. When water was added purposely to a reaction mixture with a concentration of $Ti(NMe_2)_4$ of $25 \times 10^{-2}$ moles/l. ($100 \times 10^{-2}$ equivalent/l.), as little as $18 \times 10^{-2}$ equivalent/l. of water reduced the rate and molecular weight significantly. The rate of initiation is not instantaneous since the same conversions and molecular weights are obtained irrespective of the order in which the pure reactants are mixed. It was found that the effect of impurities on the molecular weight and rate is smaller when the catalyst is added first. Apparently, a minimum amount of catalyst is then required before appreciable polymerization occurs. The presence of toluene has a marked effect, leading to higher conversions and polymers with lessened solubility in benzene. The presence of some very small molecules was shown. The overall activation energy (E) of the polymerization rate using $Ti(NMe_2)_4$ is ca −3.2 kcal./g. mole without solvent over the temperature range of −25° to −60° C. With toluene present, $E_0$ is −4.6 over the same temperature range. At −76° to −30° C. $E_0$ is positive. $Ti(NPh_2)_4$ is a much weaker catalyst than $Ti(NME_2)_4$. $Ti(OR)_2(NR_2)_2$ is a much weaker catalyst than $Ti(NR_2)_4$ and gives a molecular weight which is much higher, also. The polymer obtained without the use of solvent using $Ti(OR)_2(NMe_2)_2$ catalyst crystallizes from heptanone. The related knowledge that the sticking temperature depends on a factor other than the molecular weight (MW) suggests that the crystallization from heptanone also depends on a change in structure and is not merely an effect of these high MW's. Many of the methyl methacrylate polymers produced by the transition metal compounds of invention are definitely different in structure from free radical polymer. The sticking temperature varies greatly from 120° to 220° C. while with free radical polymer the sticking temperature is normally less than 170° C. even for polymer of very high MW. Polymer of low MW can precipitate from 4 heptanone while polymer of high MW can remain soluble i.e. polymers can be made with differences in solubility in heptanone (i.e. crystallinity) for a given MW. The softening point can vary widely for the same MW, and the material crystallized from heptanone may or may not have a higher softening point than the material left in solution. Abnormal polymer is favored by low temperatures and the use of solvent. With other transition metal or transition metal oxide compounds, like, for example, $VO(NR_2)_3$ similar results are obtained. All types of alkyl methacrylates and acrylates are polymerizable by the catalysts of the invention, e.g. methyl methacrylate, ethyl methacrylate, n-propyl methacrylate, isopropyl methacrylate, n-butyl methacrylate, isobutyl methacrylate, n-hexyl methacrylate, n-octyl methacrylate, 2-ethylhexyl methacrylate, lauryl methacrylate, oxo-tridecyl, methacrylate, "Lorol" methacrylate, tallow methacrylate, etc., and mixtures of methacrylates, and the corresponding acrylates. Polymers of the methacrylates and acrylates mixed with other monomers can of course be made as is illustrated in Example 21 above which describes polymerizing methyl methacrylate styrene. Preferred acrylates and methacrylates are those having alkyl of 18 carbon atoms or less. Tallow methacrylate is a mixture of about 33% by weight of $C_{16}$ and 67% by weight of $C_{18}$ straight-chain alkyl methacrylates. "Lorol" methacrylates are a mixture of the following weight percent ½: 3%, $C_{10}$; 61%, $C_{12}$; 23%, $C_{14}$; 11%, $C_{16}$ and 2%, $C_{18}$ straight-chain alkyl methacrylates.

EXAMPLE 22

In this example propionaldehyde is polymerized using $Ti[N(CH_3)_2]_4$ catalyst of the invention. The flask is prepared as in Example 17. To the flask is added 5 ml. of purified and water-free propionaldehyde and the temperature is adjusted to −76° C. Then 0.11 ml. of catalyst is added to the flask dropwise with stirring over a three hour period. After an additional 4 hours of reaction the excess aldehyde is removed by evaporation at 15° C. The polymer yield is 20%. Part of the polymer is soluble in methyl alcohol and has an intrinsic viscosity of 0.05. The part of the polymer which is insoluble in methyl alcohol has a softening point above 80° C. A control experiment without catalyst yields no polymer. $Ti(NR_2)_4$ is a strong catalyst for bringing about the polymerization of propionaldehyde. Polymerization takes place over the temperature range of −150° to 150° C. with the preferred range being −76° to +20° C. The products made at low temperatures are solids while those made at the higher temperatures are viscous greases. The addition of catalyst to the monomer and high monomer concentration gives rubbery products of softening point above 60°. Inverse addition yields greases. Polymerization occurs through the C—O bond since the polymer IR spectrum indicates the presence of ethers. The greases are of high molecular weight ($[\eta]=0.3$). The solids are insoluble even in boiling solvents, which may indicate crystallinity. In addition to propionaldehyde of course other aldehydes can be polymerized by the catalysts of the invention, e.g. formaldehyde, acetaldehyde, chloral, glyoxal, butyraldehyde, isobutyraldehyde, n-valeraldehyde, isovaleraldehyde, n-caproaldehyde, n-heptaldehyde, stearaldehyde, benzaldehyde, acrolein, crotonaldehyde, furfural, etc. Also carbon monoxide can be polymerized or polymerized with other monomers such as olefinic hydrocarbons like ethylene, propylene, isobutylene, etc. using catalysts of the invention. Similarly to aldehydes, of course, ketones such as acetone, methyl ethyl ketone, stearone, etc., can be polymerized by the catalysts of the invention. Preferred aldehydes and ketones are the alkyl aldehydes and ketones having not more than 18 carbon atoms per alkyl group.

EXAMPLE 23

This example describes the polymerization of vinyl isobutyl ether using the $TiCl_3[N(CH_3)_2]$ catalyst of the invention. The reaction flask is prepared as in Example 17. To this flask is added 10 ml. of the vinyl ether along with 5 ml. of dimethoxyethane. All reagents are carefully purified and freed of water. To the flask 10 ml. of a catalyst solution containing 0.25 g. of catalyst in 10 ml. of dimethoxyethane is added over a 3 hour period. The reaction temperature is maintained at 0° C. with continuous stirring. After 13 hours, 2.5 ml. of a 4% by weight solution of tertiary butyl catechol is added and the excess solvent and monomer are removed by evaporation at 10° C. The conversion to polymer is 6%. This polymer is soluble in methanol, has an intrinsic viscosity of 0.5 and a melting point of 220° C. The control experiment without catalyst yields no polymer.

EXAMPLE 24

*Bis-(diethylamido)-vanadium (IV) oxide and diethylamido-vanadium (III) oxide*

4.2 g. of tris-(dimethylamido)-vanadium (V) oxide are heated in vacuo. At 100° C. a vigorous gas development starts in the red liquid. Decomposition of the vanadiumamide is terminated after half an hour at 140° C. In the trap cooled by liquid nitrogen is trapped one gram of an equimolar mixture of diethylamine and N-ethyl-ethyleneimine (detectable by titration with hydrochloric acid and titration of the acetaldehyde produced through hydrolysis). The solid residue consists of bis (diethylamido)-vanadium (IV) oxide. Yield: 3.1 g. (quantitative). A potentiometric titration of the vanadium shows that it is tetravalent in this amide. When the starting amide (5 g.) for two hours is heated to 210° C., another diethylamide group is split off while forming trivalent vanadiumamide. Yield: 2.4 g. (nearly quantitative).

*Analysis.*—Found: V, 36.6%. Calculated on $$(C_2H_5)_2NVO$$

V, 36.1%.

The low valence vanadium amides are solid compounds, glossy from dark-violet to black. They are insoluble in benzol, and soluble in pyridine.

Amide derivatives of transition metals and -oxides are weak catalysts for vinyl isobutyl ether polymerization. The catalytic strength having the order $$Cl_3Ti(NR_2) > ClTi(NR_2)_3 > Ti(NR_2)_4 = Ti(NR_2)_2(OR)_2$$

Lower temperatures seem to be more favorable than higher temperatures for the polymerization. The polymer is of high molecular weight ($[\eta]=0.5$), but still soluble in methanol. Of course homologous vinyl ethers to vinyl isobutyl ether are also polymerizable by the catalysts of the invention, such as vinyl methyl ether, vinyl ethyl ether, vinyl n-butyl ether, vinyl t-butyl ether, vinyl n-octyl ether, vinyl 2-ethylhexyl ether, vinyl n-decyl ether, vinyl lauryl ether, vinyl oxo-tridecyl ether, vinyl "Lorol" ethers, vinyl tallow ethers, etc. The vinyl "Lorol" ethers are a mixture of vinyl straight-chain alkyl ethers having the following weight percents: 3%, $C_{10}$; 61%, $C_{12}$; 23%, $C_{14}$; 11%, $C_{16}$ and 2%, $C_{18}$ straight-chain alkyl groups. The vinyl tallow ethers are a mixture of vinyl straight-chain-alkyl ethers having about 33% by weight of $C_{16}$ and 67% by weight of $C_{18}$ straight-chain alkyl groups. Preferred ethers have not more than 18 carbon atoms in the alkyl groups.

The transition metal compounds of the invention are especially useful as polymerization catalysts per se or as transition metal compound components of catalysts such as the well-known Ziegler catalysts or with other catalysts such as triorgano-phosphines. Normally, the phosphines used will be trialkyl phosphines having not more than 18 carbon atoms per alkyl group, preferably not more than 8 carbon atoms per alkyl group. The transition metal compounds of the invention are laso useful as auxiliary products for textiles, coating and insulating material and the like. In mixtures with other types of catalyst components, the transition metal compounds are preferably present in amounts of at least 10 mol percent based on the mixture. Nor only can the catalysts of the invention be used for polymerizing α-olefins such as ethylene, propylene, isobutylene, styrene, α-methyl styrene, octene-1, dodecene-1, etc.; but as seen from the examples above they can also be used for polymerizing methacrylates, acrylonitriles, aldehydes, vinyl ethers and the like. The transition metal compounds of the invention are also catalysts for a great variety of other olefinic compounds and monomers, such as: vinyl chloride, vinylidene chloride, vinylidene chlorofluoride, vinyloxyethanol, N-vinyl-2-pyrrolidone, vinyl acetate, vinyl pyridine, vinyl propionate, maleic anhydride, fumaric esters, oxides, lactones, lactams, cyclic ethers, cyclic thioethers, cyclic anhydrides, and polymers of mixtures of these monomers. These named monomers are merely illustrative of monomers which can be polymerized and not intended to be limiting thereof, and in general α-olefinic compounds can be polymerized per se or mixed with other olefinic compounds by the catalysts of the invention. The new catalysts are useful in place of conventional catalysts for polymerizing the monomers using conventional polymerizing temperatures and in the case of many monomers lower than normal polymerizing temperatures can be used as well as normal temperatures.

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. For example, the term "hydrocarbon" radicals has been used in its broader sense, in that the "hydrocarbon" radicals of the reactants and transition metal compound products can also contain constituents other than carbon and hydrogen which are non-reactive or at least which do not interfere to more than a degree and can even promote the desired reaction by which the products are formed or the use of the products as polymerization catalysts or otherwise; examples of substitutive groups which can be present are nitro, fluoro, chloro, nitrile, etc. One skilled in the art will recognize that a "hydrocarbon" radical containing a non-interfering group is the equivalent of the corresponding "hydrocarbon" radical containing only carbon and hydrogen. Accordingly, modificaitons are contemplated which can be made without departing from the spirit of the described invention.

What is claimed is:

1. In a process for catalytically polymerizing compounds, the new and improved catalysts comprising transition metal compounds of the formula $$(R^1R^2N)_a(R^3O)_b(BH_4)_cMX_d$$

wherein $R^1$, $R^2$ and $R^3$ taken singly are hydrocarbon radicals having not more than 8 carbon atoms, M is selected from the class consisting of titanium and vanadium transition metals and metal oxides, X is a halogen, $a$ is at least 1 and is an integer, $b$, $c$ and $d$ are selected from O and integers but not more than one is an integer in a compound, when M is tetravalent titanium one of $b$, $c$ and $d$ is an integer, and $a+b+c+d$ equals the valence of M.

2. A process of claim 1 wherein said compounds are acrylonitrile.

3. A process of claim 1 wherein said compounds are alkyl methacrylates.

4. A process of claim 1 wherein said compounds are aldehydes.

5. A process of claim 1 wherein said compounds are vinyl ethers.

6. A process of claim 1 wherein said catalysts are a mixture of transition metal compounds and a triorgano-phosphine.

7. A process of claim 1 wherein said compounds are acrylonitrile, $c$ and $d$ are O, $a+b=4$, M is titanium, and $R^1$, $R^2$ and $R^3$ are alkyl radicals having not more than 8 carbon atoms.

8. A process of claim 1 wherein said compounds are acrylonitrile, $b$, $c$ and $d$ are O, $a=4$, M is titanium, and $R^1$ and $R^2$ are alkyl radicals having not more than 8 carbon atoms.

9. A process of claim 1 wherein said compounds are acrylonitrile, $b$, $c$ and $d$ are O, $a=3$, M is VO, and $R^1$ and $R^2$ are alkyl radicals having not more than 8 carbon atoms.

10. A process of claim 1 wherein said compounds are alkyl methacrylates, $b$, $c$ and $d$ are O, $a=4$, M is titanium, and $R^1$ and $R^2$ are alkyl radicals having not more than 8 carbon atoms.

11. A process of claim 1 wherein said compounds are alkyl methacrylates, $c$ and $d$ are O, $a+b=4$, M is titanium, and $R^1$, $R^2$ and $R^3$ are alkyl radicals having not more than 8 carbon atoms.

12. A process of claim 1 wherein said compounds are alkyl methacrylates, $b$, $c$ and $d$ are O, $a=3$, M is VO, $R^1$ and $R^2$ are alkyl radicals having not more than 8 carbon atoms.

References Cited

UNITED STATES PATENTS

| | | | |
|---|---|---|---|
| 2,734,047 | 2/1956 | Smith et al. | 260—85.3 |
| 2,887,473 | 5/1959 | Balthis | 260—94.9 |
| 2,924,589 | 2/1960 | Jurgeleit | 260—67 |
| 2,972,607 | 2/1961 | Coover et al. | 260—93.7 |

OTHER REFERENCES

Chemical Abscracts, vol. 54, No. 14 (July 25, 1960).

WILLIAM H. SHORT, *Primary Examiner.*

L. M. PHYNES, *Assistant Examiner.*